8364X
I. Gallon.
Thrashing Mach.
Patented Aug. 18, 1834.
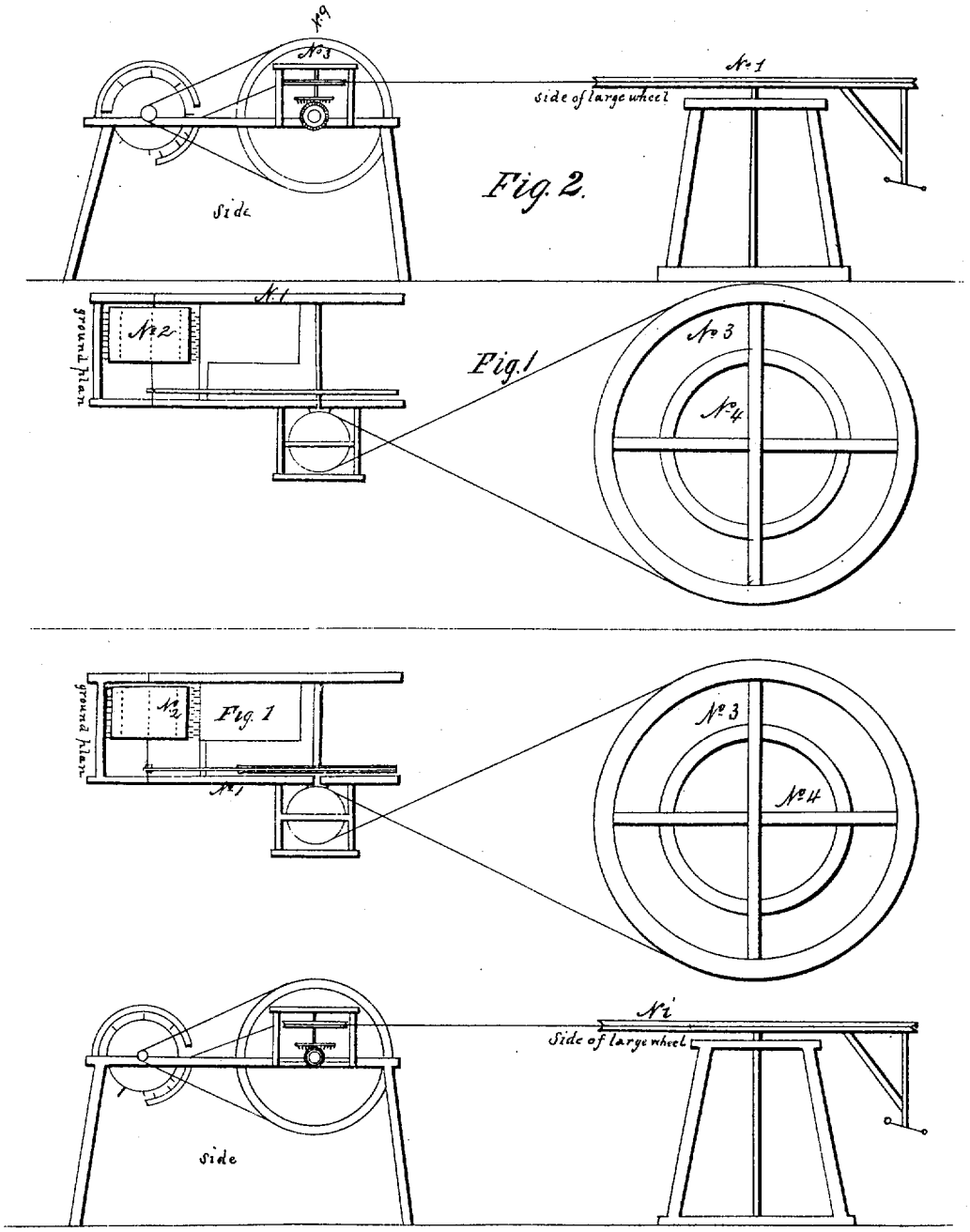

Aug 18.1834.

Isaac Gallop of Plainfield Connecticut
Letters Patent

The Schedule referred to in these Letters Patent and making part of the same containing a description in the words of the said Isaac Gallop, himself of his improvement in thrashing all kinds of grain, and grass seeds by machinery at one operation called the *New Thrasher.*

To all persons to whom these presents shall come. Isaac Gallop of Plainfield in the County of Windham and State of Connecticut a Citizen of the United States, gentleman. Sends Greeting, Be it known that I the said Isaac Gallop, have invented, constructed, made, and applied to use, a new and useful improvement in *thrashing* all *kinds* of *grain* and grass seeds by machinery called the *New Thrasher.* Specified in the words following, viz), A *frame* is constructed of timber four inches square the side pieces of which are eight feet long. and the end pieces 3 feet long. making the *frame* when completed, 8 feet by 3 feet, to be supported by timbers of the same size framed with tenons and mortices under side the frame 3 feet long. so that the top of the *frame* may stand horizontally about 3 feet above the surface of the floor upon which the same is to be operated. The *machine* is to run in this *frame* the exterior of which has been described as above. The size of the timber of which this *frame* is made, as also the dimencions of the *frame* may be varied to suit the maker either in the length, breadth, or height. and the same may be constructed of iron instead of wood — See Fig I No 1, on the accompanying drawing. *A cylinder* 30 inches diameter and 20 inches long constructed of wood in the usual mode of constructing drums or card cylinders. having an iron arbor running through the centre 1 1/2 inch square, resting upon and running in gudgeons upon the top of the *frame*. and as near one end of it,

8364X as the revolutions of the cylinder will permit, the ends of the arbor are made round by turning so as to revolve in the gudgeons with as little friction as possible. Upon the outer side of the cylinder are firmly driven in six rows of iron teeth from end to end of the cylinder projecting 2/2 inches above its surface & placed 3 inches equal distance from each other. making in each row eight teeth. See Fig I No 2. A Concave Base extending across the frame, the same length as the cylinder, constructed of wood, corresponding in cavity with the surface of the cylinder, lying under the cylinder and rising up to its centre on the power side of the cylinder in which concave base are driven iron teeth corresponding with those in the cylinder of the same size and dimensions projecting the same distance so that as the cylinder revolves on its axis the iron teeth on the cylinder pass between the iron teeth in the concave base. thus separating the seeds and grain from the stock.

Upon the end of the arbor is applied a pulley 6 inches diameter and 5 inches long, over which passes the band, or belt of leather connecting this pulley with a wheel at the other end of the frame 5 feet and 6 inches diameter, around which also passes the band imparting from this wheel to the cylinder its motion. The axis of this wheel is made of iron 1/2 inch square upon which is affixed an iron cog wheel 4 inches diameter, which cog wheel works into bevel cogs of cast iron upon an upright shaft 12 inches diameter, upon the end of which is a pulley 18 inches diameter this pulley is so constructed as to be raised or lowered on its upright axis in such manner as to be horizontal with the motion wheel. The frame containing this machine is to be placed upon the floor and secured at the bottom by cleets and screws so that it will remain stationary. The cylinder should be covered with a Cap. From this last mentioned horizontal pulley passes a Band of rope connecting the same with the motion wheel see Fig I No 3. This Rope must not be less than 1 inch or 1¼ inch diameter. At a suitable distance from the above mentioned frame, either within the building where the frame is placed, or without the same, as the operator may find most convenient stands a frame for the motion wheel 6 feet square at bottom and 3 feet square at top, 5 or 6 feet high, made of square timber 4 inches square standing flat upon the ground or floor, through the centre of this frame stands a perpendicular shaft of timber 8 inches diameter at bottom and eight inches at the top lessening gradually, banded with iron at top, each side of the arms rising 2 feet above the top of the frame. standing in a cross sill in the centre at the bottom, and secured in the centre of the top of the frame, by one cross piece with an iron band around the shaft, or two cross pieces of wood halved out so that this shaft revolves between them. Upon the top of this shaft is made the motion wheel 11 feet diameter, constructed by means of arms framed into the top of the shaft with a rim upon the ends of these arms. and between this motion wheel and the top of its frame a sweep is framed sloping over the top of the frame, so that the end of the sweep reaches within 3 feet of the ground or floor: and the sweep should be 7 feet long. and of sufficient size to propel the machinery by means of horse or ox power from the end of this shaft See Fig I No 4. also see Fig II. No 1.

When the power is applied to this shaft motion immediately given to the cylinder, then the grain is to be laid upon the apron composed of boards, sloping towards the cylinder 3 feet long so that the grain is passed down the apron to the teeth of the cylinder where the seeds are separated from the straw or stalks by the velocity of the machine Fig. III.

The Concave Bed extends one fourth around the cylinder and no more. rising to the centre of the arbor of the cylinder, and sinking from thence
one quarter of its diameter, see Fig III. To support the upright shaft
F. II. No 2. there is to be raised upon the top of the frame, by timbers the
same size as the frame itself, framed into the top piece, extending horizon-
tally 1 1/2 foot, then two pieces perpendicular framed into them rising 3.
feet perpendicular with a cap piece 3 feet long, so as to let the upright -
shaft turn in the lower side of this cap piece, and the 18 inch pulley
revolve between these upright timbers - a crease or gain to be cut into
a point upon the edge of the pulleys so as to receive and hold ~~down~~ the rope
from the motion wheel, see Fig II No 3. The drawing hereunto annex
ed is made part of this schedule and unto that reference is to be had.

If the frame for the motion wheel is not sufficiently heavy to preserve its
distance from the machine (so that the horse may pass between them) then
the bottom of the frame for the motion wheel should be loaded with stone.

The foregoing Invention does not embrace, and the petitioner does not claim
that the cylinder of itself, the pullies, the arbors, or the motion wheel or either
of them, when disconnected, are of his invention but the petitioner in his
application for his Patent does claim as new, useful and of his own invention
the peculiar structure and position of the Concave Base, and its relative propor-
tion to the cylinder, the arrangement of the teeth in the same and their rel-
ative peculiar contact with those on the cylinder, the position and effect of
the bevel cogs and the relative size and proportion of the several wheels ~~and~~
pullies. Cog wheels to and with the motion wheel, and the cylinder togeth-
er with their combination, are all new and useful in their results and
are a discovery of his own, and belong to no one else. and for these improve-
ments and discoveries this patent is claimed and is to be known and
designated by the name aforesaid. viz. The New Thrasher In testimony that the above is a true specification of my said im-
provement, as above described, I have hereto set my hand this 12th day
of June Anno Domini 1834

Exd. Witnesses
W.J.C. Andrew T. Judson
Richard Fenner

Isaac Gallop (Patented 18th August 1834)

(1612 words)

Drawing)